United States Patent [19]

Nakamura

[11] Patent Number: 4,903,311

[45] Date of Patent: Feb. 20, 1990

[54] CHARACTER REGION EXTRACTING METHOD AND APPARATUS CAPABLE OF IMPLEMENTING THE METHOD

[75] Inventor: Masahiro Nakamura, Yokohama, Japan

[73] Assignee: Ricoh Company, Ltd., Japan

[21] Appl. No.: 189,403

[22] Filed: May 2, 1988

[30] Foreign Application Priority Data

May 1, 1987 [JP] Japan .................................. 62-108553
May 30, 1987 [JP] Japan .................................. 62-135397

[51] Int. Cl.$^4$ .............................................. G06K 9/34
[52] U.S. Cl. .......................................... 382/9; 382/18; 382/48
[58] Field of Search .................... 362/9, 48, 16, 18, 19; 358/462, 450, 452

[56] References Cited

U.S. PATENT DOCUMENTS

| | | | |
|---|---|---|---|
| 4,364,023 | 12/1982 | Isshiki et al. | 382/48 |
| 4,377,803 | 3/1983 | Lotspiech et al. | 382/9 |
| 4,481,665 | 11/1984 | Ota | 382/48 |
| 4,633,502 | 12/1986 | Numba | 382/9 |

Primary Examiner—Leo H. Boudreau
Assistant Examiner—Joseph Mancoso
Attorney, Agent, or Firm—Mason, Fenwick & Lawrence

[57] ABSTRACT

A character region extracting method adapted to character recognition comprises the following three steps. The first step is to segmentate a first region (BL1) from a document image by extracting projection of the document image in a first direction parallel to a character string and detecting a range in which the projection is continuous in a second direction perpendicular to the first direction. The range defines the first region. The second step is to segmentate a second region (sBL1) from the first region by extracting projection of the first region in the second direction and detecting a range in which the projection is continuous in the first direction. The range defines the second region. The third step is to segmentate a third region (BL2) from the second region by extracting projection of the second region in the first direction and detecting a range in which the projection is continuous in the second direction. The range defines the third region. The third region may be joined together so as to form a fourth region containing characters or a character string.

17 Claims, 12 Drawing Sheets

CHARACTER REGION EXTRACTING METHOD AND APPARATUS CAPABLE OF IMPLEMENTING THE METHOD

BACKGROUND OF THE INVENTION

The present invention generally relates to a character region extracting method and an apparatus capable of implementing the method which are adapted to character recognition.

As is well known, characters or character strings on a document are extracted as a preprocess of character recognition. To meet this requirement, projection of a document image in a direction of alignment of characters is extracted. Then a region in which the projection is continuous in a direction perpendicular to the character strings is segmentated as a character line. Subsequently, projection of the document image for each of the segmentated character lines is extracted. Then a region in which the projection is continuous in the direction of the character strings is segmentated as a region of a rectangular shape.

However, the conventional character region segmentating or extracting method has a disadvantage that it is impossible to correctly segment character lines on a document such that characters of relatively small sizes constituting a character string are located adjacent, in the direction of the character string, to a character of a relatively large size or a character string composed of relatively large sizes. This is because projection of the character string composed of characters of relatively small sizes is included in projection of the character of the relatively large size or the character string composed of characters of relatively large sizes, so that it is impossible to discriminate the projection of the characters of the relatively small sizes against the projection of the relative large size character or character string. Therefore, recognition of characters becomes impossible.

In general, in the character recognition for a language such as Japanese having a number of characters of similar patterns, it is difficult to find one candidate character out of a plurality of candidate characters with high accuracy by using a character recognition process per character unit. Therefore, an improved character recognition method is being studied in which a candidate of the character string is compared with character lines which are related to categories and are stored in a knowledge dictionary, and one candidate character is identified for each character included in the character string, by referring to the compared result. In general, information for indicating the category represented by characters included in character strings is provided on the document, so that the collating sequence with the knowledge dictionary can be facilitated.

However, the processing speed of the collating sequence is not high at present.

SUMMARY OF THE INVENTION

Accordingly, a general object of the present invention is to provide a character region extracting method in which the above disadvantages of the conventional method have been eliminated.

A more specific object of the present invention is to provide a character region extracting method in which character segmentation can be carried out with accuracy even for a document in which character strings of characters of different sizes are mixed.

The above objects of the present invention are achieved by a character region extracting method comprising the following steps of segmentating a first region (BL1) from a document image by extracting projection of the document image in a first direction parallel to a character string and detecting a range in which the projection is continuous in a second direction perpendicular to the first direction, the range defining the first region; segmentating a second region (sBL1) from the first region by extracting projection of the first region in the second direction and detecting a range in which the projection is continuous in the first direction, the range defining the second region; and segmentating a third region (BL2) from the second region by extracting projection of the second region in the first direction and detecting a range in which the projection is continuous in the second direction, the range defining the third region.

Another object of the present invention is to provide a character region extracting method in which segmentated character lines are combined with each other in order to facilitate the character identification using the knowledge dictionary.

The above object of the present invention is achieved by a character region extracting method comprising in addition to the above steps, the step of joining third regions in the first direction in accordance with a relationship of a relative location between the third regions and a relationship of a relative size between the third regions, so that a fourth region (BL3) containing characters or character strings is extracted. Preferably, the method further comprises the step of joining fourth regions in the second direction in accordance with a relationship of a relative location between the fourth regions and a relationship of a relative size between the fourth regions, so that a fifth region (BL4) containing characters or character strings is extracted.

Yet another object of the present invention is to provide a character region extracting apparatus which can implement the above character region extracting methods.

The above object of the present invention is achieved by a character region extracting apparatus comprising the following constituents. An optical scanning part extracts a document image in the form of an electric signal by optically scanning a document. An image memory stores the document image extracted by the optical scanning part. A projection extracting part extracts projection of the document image in a first and second direction. The first direction corresponds to a scanning direction in the optical scanning part, and the second direction is perpendicular to the first direction. A projection buffer stores the projection in each of the first and second direction extracted by the projection extracting part. A region segmentating part segmentates a region by using the projection stored in the projection buffer. The region segmentating part further comprises a first part for segmentating a first region (BL1) from the document image by using the extracted projection of the document image in the first direction and detecting a range in which the projection is continuous in the second direction, said range defining the first region; a second part for segmentating a second region (sBL1) from the first region by using the extracted projection of the first region in the second direction and detecting a range in which the projection is continuous in the first direction, the range defining the second region; and a third part for segmentating a third region (BL2) from the second region by using the extracted projection of the second region in the first direction and detecting a range in which the projection is continuous in the second direction, the range defining the third region. A memory part stores the extracted third region.

Other objects, features and advantages of the present invention will become apparent from the following detailed description when read in conjunction with the accompanying drawings.

DETAILED DESCRIPTION

Figure 1:
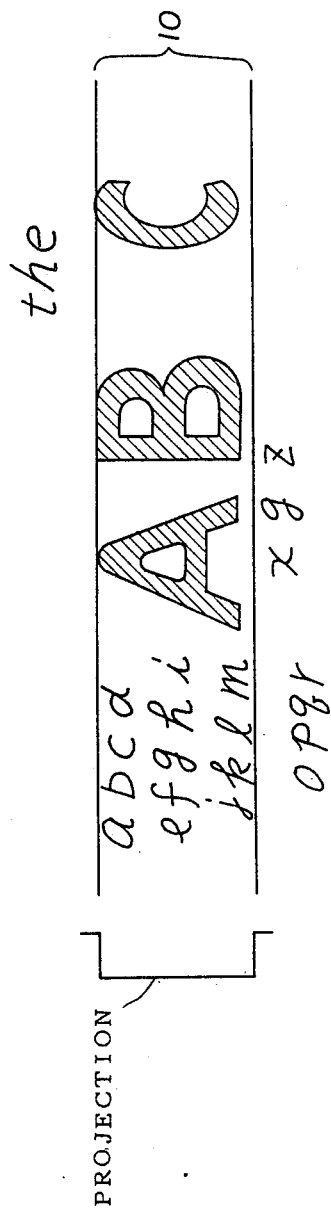
FIGS. 1A and 1B are views for showing character arrangements on a document to be optically scanned.

FIG. 1A shows a plurality of characters of different sizes on a document to be optically scanned. As described previously, the conventional character region segmentating method cannot segment each of character lines composed of relatively small size characters "abcd", "efghi" and "jklm". This is because projection in which the direction of the character strings is continuous in the vertical direction is within a range 10 due to the presence of relatively large characters "ABC". Therefore, the characters included in the character strings "abcd". "efghi" and "jklm" cannot be identified.

FIG. 1B shows a plurality of characters on a document to be optically scanned. Areas 12, 13 and 14 on the document is concerned with an address, and areas 15 and 16 are concerned with a telephone number. An area 11 is filled with a character or symbol having a size corresponding to a hatched rectangular shape. It can be easily seen from the above description that the conventional method cannot segment character lines of the areas 12 through 16 due to the presence of the area 11.

If the area 11 did not exist on the document, the character lines 12 through 16 could be segmentated. As described above, the character lines 12 through 14 are concerned with the address information and the character lines 15 and 16 are concerned with information of the telephone number. In some documents, areas on the document are predetermined so as to be filled with characters of specific categories, as in the document of FIG. 1B. As described before, the use of the knowledge dictionary can facilitate the process for determining one candidate character. In this case, each of the character lines 12 through 16 is compared with the character lines registered in the knowledge dictionary. If the separated areas 12, 13 and 14 belonging to the category of address can be segmentated as one continuous character line, the identifying process could be more easily performed. However, the conventional method does not have such a process that character lines of the same information category are joined together to form one continuous character line.

A description is given of a preferred embodiment of the present invention.

Figure 2:
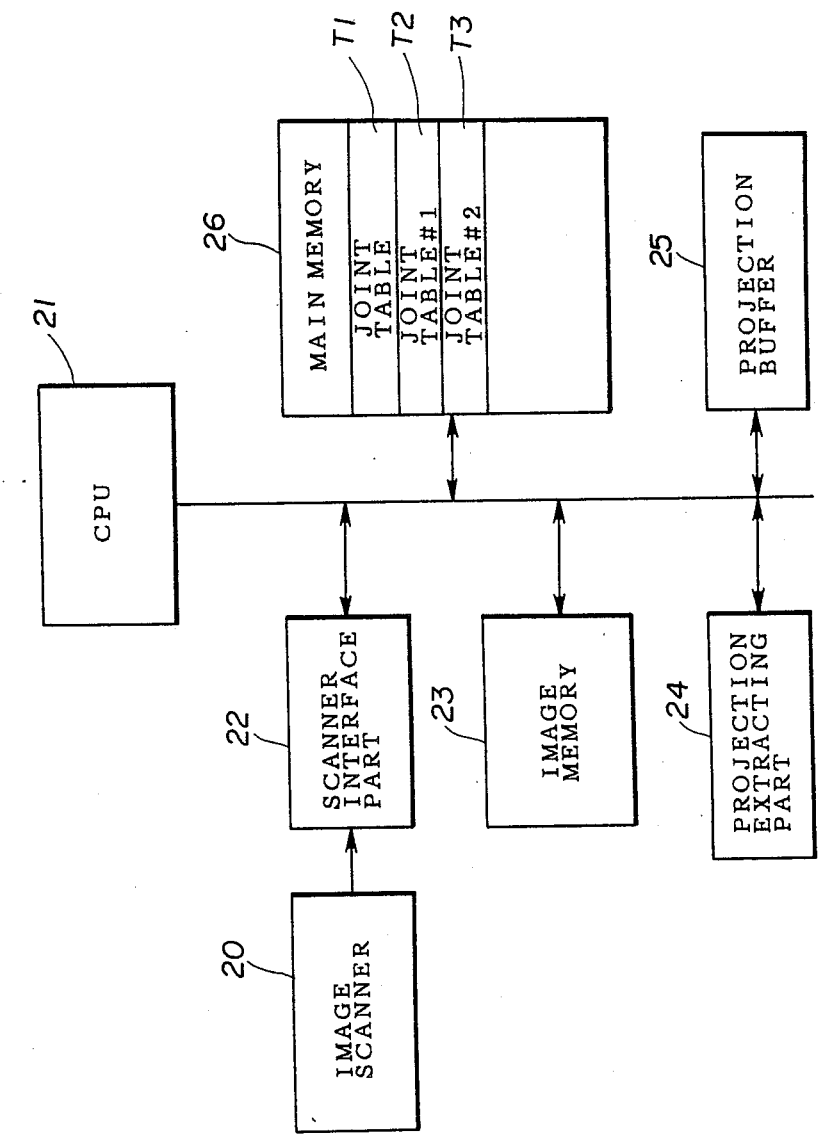
FIG. 2 is a block diagram of an apparatus capable of implementing a first preferred embodiment of the present invention.

FIG. 2 is a block diagram of a configuration of an apparatus which can implement the character region extracting process of the present invention. An image scanner 20 optically scans the document and supplies a document image of binary values 0 and 1 to an image memory 23 through a scanner interface part 22. A projection extracting part 24 carries out raster scan for the document image stored in the image memory 23 in response to instructions from a central processing unit (hereafter simply referred to as a CPU), and extracts projection of the document image in the main scanning direction (,or the raster scanning direction) or the sub-scanning direction. A projection buffer 25 is used for temporarily storing the projection extracted by the projection extracting part 24.

Figure 3:
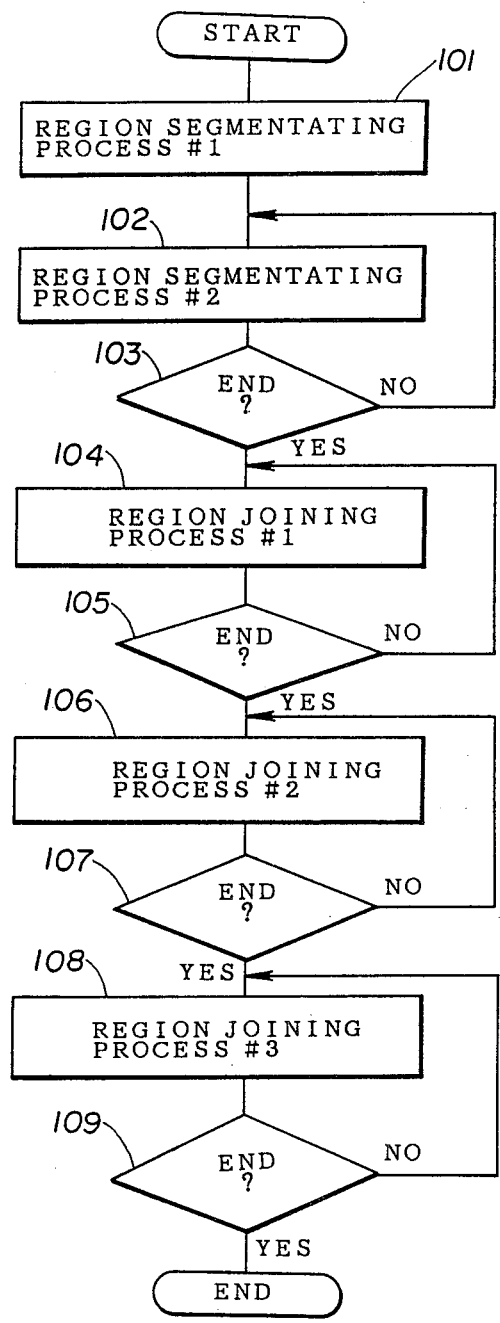
FIG. 3 is a flowchart of a general sequence of the embodiment of the present invention.

FIG. 3 is a flowchart indicating an overall sequence of the character region extracting process of the embodiment. As shown, the character region extracting process comprises character region segmentating processes #1 and #2, and region joining processes #1, #2 and #3.

A description is now given of the region segmentating process #1 (step 101). After the document image is stored in the image memory 23, the projection extracting part 24 is activated by the CPU 21. The projection extracting part 24 begins extracting projection of the document image in the main scanning direction (identical to an X direction) and sends projection data to the projection buffer 25, which stores the projection data therein. The projection data have binary values of 1 and 0 which represent the presence/non-presence of a back pixel, respectively. Alternatively, the number of black pixels on the main scanning direction may be used as the projection data.

When the projection extracting process is terminated, the CPU 21 refers to the projection data stored in the projection buffer 25, and segments a region BL1 in which the projection is continuous in the sub-scanning direction. Then, the CPU 21 finds a Y address at the top (start) and a Y address at the bottom (end) of the segmentated region BL1, and sends these data to a region table T1 provided in a main memory 26 shown in FIG. 2. In a case where the projection data is represented by binary values of 1 and 0 which denotes the presence/non-presence of black pixels, a range in which black pixels are continuous in the sub-scanning direction is segmentated as a region BL1. On the other hand, in a case where the projection data is represented by the number of black pixels, a range in which projection having a value exceeding a predetermined threshold value is continuous in the sub-scanning direction, is segmentated as a region BL1.

Figure 4:
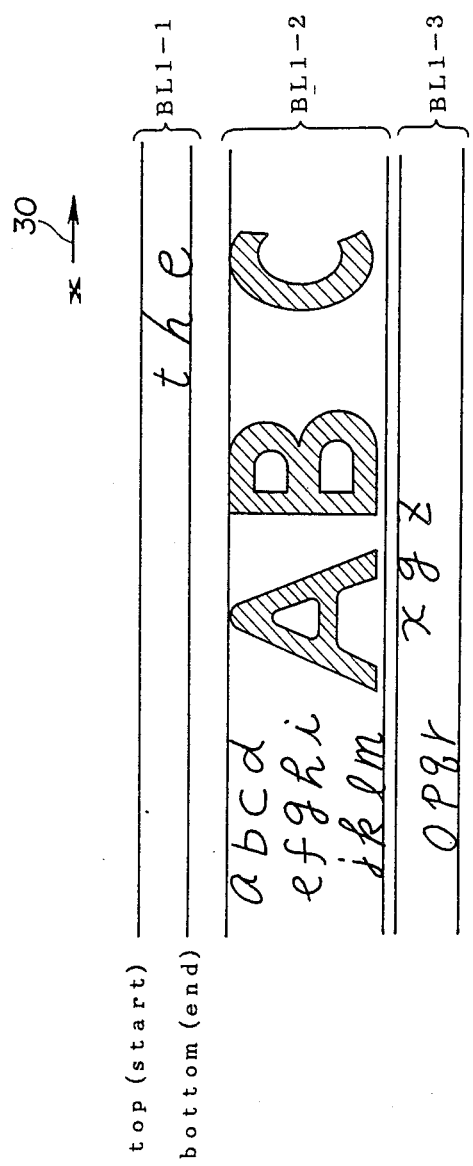
FIG. 4 is a view for explaining a first region segmentating process shown in FIG. 3.

FIG. 4 is a view for explaining the region segmentating process #1 which is carried out for the characters shown in FIG. 1A. The projection extraction for the document image is performed in a direction indicated by an arrow 30, i.e., the main scanning direction. The projection extracting process segments the document image of FIG. 4 in the manner described above, so that three regions BL1-1, BL1-2 and BL1-3 shown in FIG. 4 are obtained. A Y address at the top (start) of each of the regions BL1-1, BL1-2 and BL1-3, and a Y address at bottom (end) of each of the regions BL1-1, BL1-2 and BL1-3 are stored in the region table T1 in the main memory 26.

Subsequently, a region segmentating process #2 following the region segmentating process #1 at step 101 is performed (step 102). The region segmentating process #2 is carried out for each of the segmentated regions BL1-1, BL1-2 and BL1-3.

Figure 5:
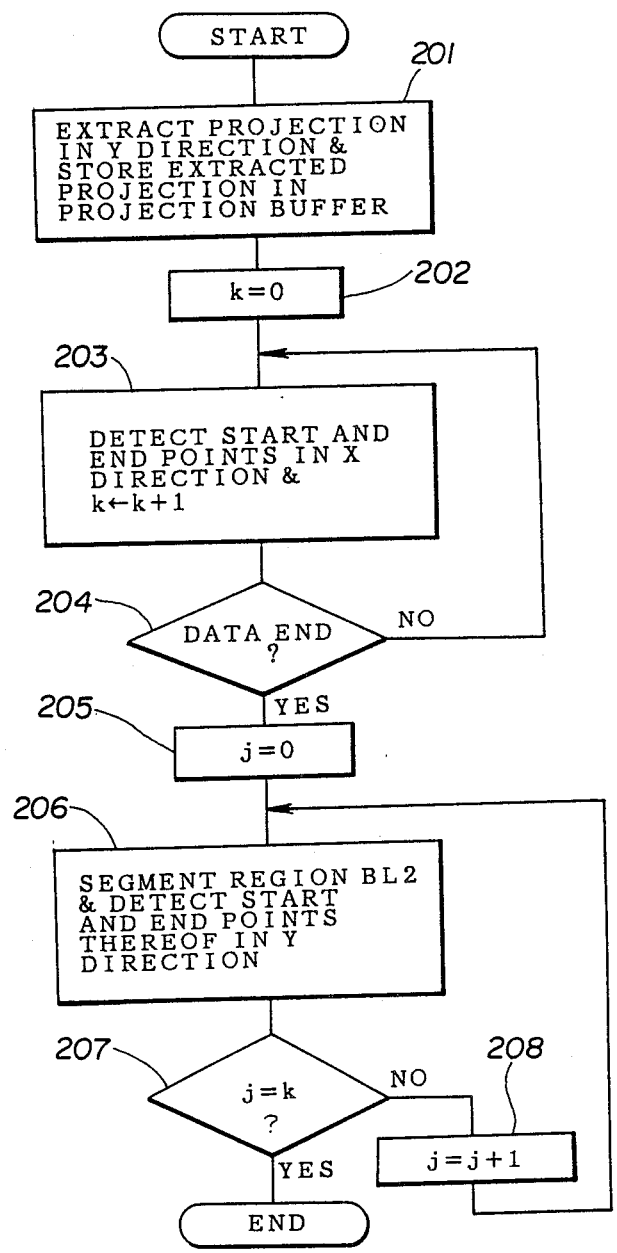
FIG. 5 is a flowchart of a second region segmentating process shown in FIG. 3.

FIG. 5 shows a detailed flowchart of the region segmentating process #2 at step 102. At the commencement of the process #2, the CPU 21 supplies the Y addresses at the top and bottom of the region BL1-1 to the projection extracting part 24, and instructs the projection extraction in the sub-scanning direction. The projection extracting part 24 carries out the extraction of projection in the sub-scanning direction for the region BL1-1, and sends the projection data to the projection buffer 25, which stores the same (step 201). This projection data corresponds to the number of black pixels or the presence/non-presence of black pixels in sub-scanning lines.

Then, the CPU 21 initializes a program counter k which is a software counter provided in the main memory 26 (step 202). The counter k is used for counting the number of regions which are segmentated by the projection in the sub-scanning direction.

Thereafter, the CPU 21 refers to the projection data stored in the projection buffer 25, and detects a region in which projection is continuous in the main scanning direction (step 203). When a region is detected, the CPU 21 calculates addresses Ws and We of the detected region in the X direction at the start and end points thereof, and sends these addresses to the region table T1 in the main memory 26. And the counter k is incremented every time when one continuous projection region is detected (step 203). A region segmentated by this step is hereafter referred to as a sub-region sBL1. In a case where the projection data is represented by binary values denoting the presence/non-presence of black pixels, a range in which binary ones continues is defined as a sub-region sBL1. In a case where the projection data is represented by the number of black pixels, a range in which projection having a value exceeding a predetermined threshold value is defined as a sub-region sBL1. Step 203 is repeatedly carried out until all the projection data has been processed (step 204).

Figure 6:
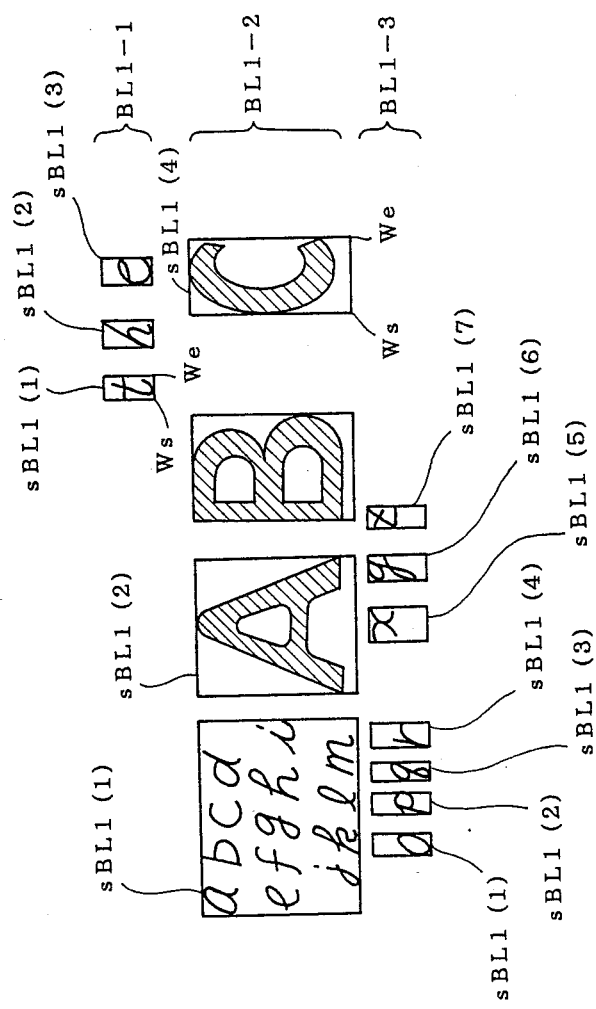
FIG. 6 is a view for explaining a part of the second region segmentating process shown in FIG. 3.

FIG. 6 is a view for explaining the steps 201 through 204 shown in FIG. 5. As shown, three sub-regions sBL1(1), sBL1(2) and sBL1(3) are obtained for the region BL1-1. As described above, the X addresses Ws and We at the start and end points of each of the sub-regions sBL1(1), sBL1(2) and sBL1(3) are stored in the region table T1. When the sequence of the steps 201 through 204 is carried out for the region BL1-2, four sub-regions sBL1(1), sBL1(2), sBL1(3) and sBL1(4) are obtained. Similarily, seven sub-regions sBL1(1) through sBL1(7) are obtained when the sequence of the steps 201 through 204 is carried out for the region BL1-3.

When the discrimination result at step 204 is affirmative, i.e., it is found that all the projection data has been processed, a program counter j which is a software counter provided in the main memory 26 is initialized (step 205). The program counter j is used for counting the number of sub-regions sBL1 included in one region BL1.

Thereafter, the CPU 21 provides the projection extracting part 24 with the addresses Ws and We at the start and end points of i-th sub-region sBL1(i) and instructs the projection extracting part 24 to extract projection of the i-th sub-region sBL1(i) in the main scanning direction (step 206). The projection extracting part 24 extracts projection of the sub-region in the main scanning direction and sends the extracted projection data to the projection buffer 25.

The CPU 21 refers to the projection data stored in the projection buffer 25 and segmentates a region BL2 in which continuous projection is obtained in the sub-scanning direction. Then, the CPU 21 detects a start address Hs and an end address He in the Y-direction and sends these addresses to the region table T1. Then, when it is found that all the sub-region sBL1 have not been processed (step 207), the CPU 21 increments the value of the counter j by one every time when the region segmentating process for one sub-region sBL1 terminated (step 208). In this manner, all the sub-regions sBL1 are subjected to the segmentating process described above, and regions BL2 are obtained for each of the sub-regions sBL1. Address information (i, Hs, He, Ws, We) of each of the regions sBL2 are registered in the region table T1 in the main memory 26 where "i" indicates one of the region BL2 which is counted by a counter i which is a software counter provided in the main memory 26. When the value of the counter j becomes equal to the value of the counter k (step 207), the region segmentating process #2 is terminated.

Figure 7:
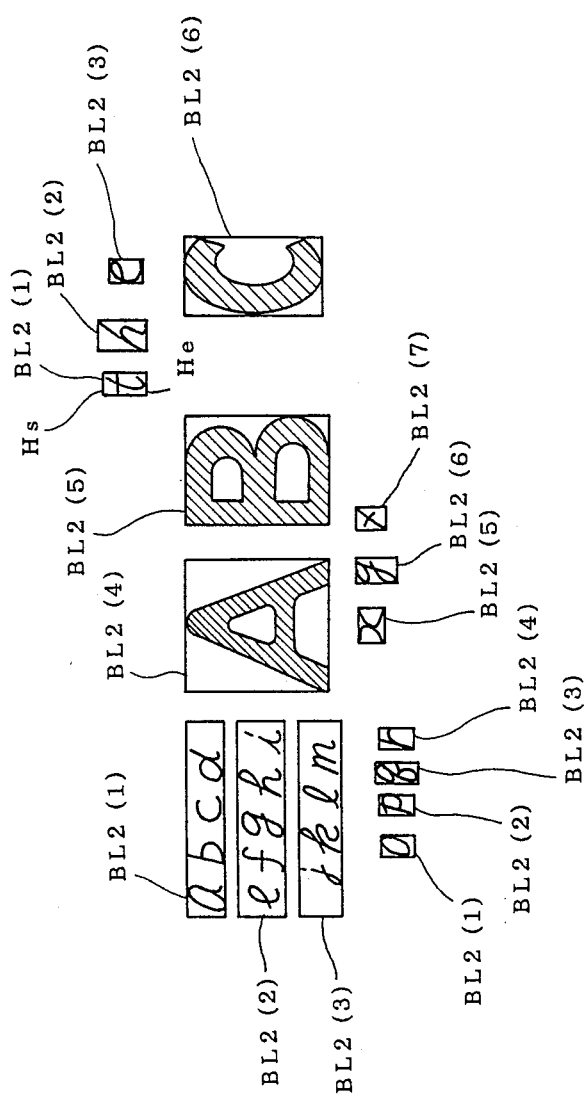
FIG. 7 is a view for explaining the remaining part of the second region segmentating process shown in FIG. 3.

FIG. 7 shows regions BL2 obtained by subjecting sub-regions sBL1 to the region segmentating process composed of steps 206 through 208 shown in FIG. 5. As shown, regions of BL2(1), BL2(2) and BL2(3) having characters 't', 'h', and 'e', respectively are obtained by subjecting the sub-regions sBL1(1), sBL1(2) and sBL1(3) to the region segmentating process composed of steps 206 through 208. Likewise, three regions BL2(1), BL2(2) and BL2(3) each having character strings, as well as three regions BL2(4), BL2(5) and BL2(6) having large capital characters 'A', 'B' and 'C', respectively are obtained. Similarily, seven regions BL2(1) through BL2(7) having characters 'o', 'p', 'q', 'r', 'x', 'y' and 'z', respectively are obtained.

When the region segmentating process #2 is terminated, regions of individual characters or character lines are segmentated for the documents shown in FIG. 1A. Then, each of characters included in each of the character lines BL2(1) through BL2(3) in the region BL1-2 can be segmentated by extracting projection thereof in the Y direction.

It is noted that in the above region segmentating process, a character composed of more than two separated parts such as 'i', 'j' may be divided into individual parts. For example, a character 'i' is divided into two parts '.' and '1'. In general, Chinese characters are composed of separated parts, and the division into parts occurs much more frequently. In addition, in a case where it is desired that the character recognition is carried out per character line comprising a plurality of characters, a plurality of segmentated regions of characters must be joined so as to form one character line related to a specific category such as address information, telephone information and so on. For these reasons, region joining processes #1, #2 and #3 executed at steps 104, 106 and 108, respectively are provided in the present embodiment.

Figure 8:
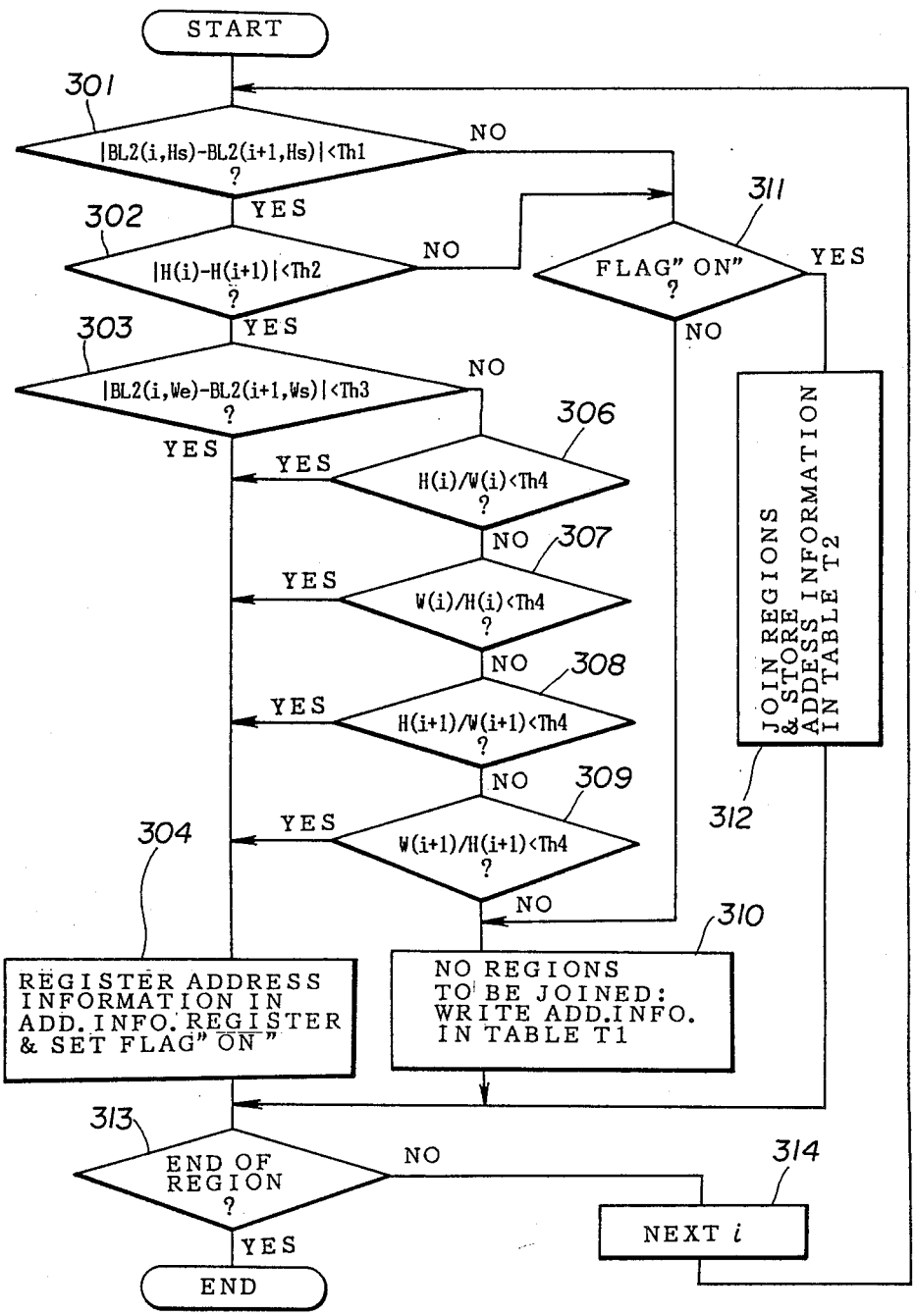
FIG. 8 is a flowchart of a first region joining process shown in FIG. 3.

A description is given of the region joining process #1, by referring to FIG. 8.

The CPU 21 shown in FIG. 2 refers to the region table T1 and calculates an absolute value of a difference between the X address Hs at the start point of the region BL2(i) and the X address Hs at the start point of the region BL2(i+1) adjacent to the region BL2(i) in the X direction. Then the CPU 21 compares the calculated absolute value of the difference with a predetermined threshold value $Th_1$ (step 301). That is, the CPU 21 checks whether or not $|BL2(i, Hs) - BL2(i+1, Hs)| < Th_1$. When the absolute value of the difference is equal to or larger than the threshold value $Th_1$, the process proceeds to step 311. Adversely, when the absolute value of the difference is smaller than the threshold value $Th_1$, step 302 is executed. At step 302, an absolute value of a difference between the height H(i) of the region BL2(i) and the height H(i+1) of the region BL2(i+1) is compared with a predetermined threshold value $Th_2$. That is, the CPU 21 checks whether or not $|H(i) - H(i+1)| < Th_2$. When the absolute value of the difference is equal to or larger than the threshold value $Th_2$, the process proceeds to step 311. Alternatively, when the absolute value of the difference is smaller than the threshold value $Th_2$, step 303 is executed. At step 303, an absolute value of a difference between the width of the region BL2(i) and the width of the region BL2(i+1) is compared with a predetermined threshold value $Th_3$. That is, the CPU 21 checks whether or not $|BL2(i, We) - BL2(i+1, Ws)| < Th_3$. When the absolute value of the difference is equal to or larger than the threshold value $Th_3$, the process proceeds to step 304.

A case where the process reaches step 304 means that the regions BL2(i) and BL2(i+1) adjacent to each other in the X direction have been decided to be joined together (step 304). An address information register for storing address information of regions to be joined is provided in the main memory 26. Additionally, a joint flag FLAG is provided in the main memory 26. The CPU 21 registers the address information of the regions B23(i) and BL2(i+1) which are to be joined together in the address information register. Simultaneously, the CPU 21 sets the joint flag FLAG to ON.

At step 303, when the discriminated result is negative, step 306 is executed. At step 306, a ratio of the height H(i) to the width W(i) of the region BL2(i) is compared with a predetermined threshold value $Th_4$. When the ratio is equal to or larger than the threshold value $Th_4$ the process proceeds to step 307. At step 307, a ratio of the width W(i) to the height H(i) of the region BL2(i) is compared with the threshold value $Th_4$. When the ratio is equal to or larger than the threshold value $Th_4$, the process proceeds to step 308. At step 308, a ratio of the height H(i+1) to the width W(i+1) of the region BL2(i+1) is compared with the threshold value $Th_4$. When the ratio is equal to or larger than the threshold value $Th_4$, the process proceeds to step 309. At step 309, if a ratio of the width W(i+1) to the height H(i+1) of the region BL2(i+1) is equal to or larger than the threshold value $Th_4$, the process proceeds to step 310. At each of steps 306 thought 309, when the ratio is smaller than the threshold value $Th_4$, the process proceeds to step 304. When the process reaches step 310, the adjacent regions BL2(i) and BL2(i+1) are decided not to be joined together. At step 310, the address information of each of the adjacent regions BL2(i) and BL2(i+1) is registered in a joint table T2 provided in the main memory 26.

At step 311, the CPU 21 checks whether the joint flag FLAG has been set or not. When the result is affirmative, this means that there is a region such as the region BL2(i−1) to be joined which is obtained by the previous process with respect to the process for the region BL2(i). Therefore, the proceeding region BL2(i−1) and current region BL2(i) are joined together. At this time, address information of the joined region is stored in the joint table T2 in the main memory 26. The address information of the joined region is calculated by using the address information of the preceding region BL2(i−1) registered in the address information register and the address information of the region BL2(i). Alternatively, when the result at step 311 is negative, which means that there is no region to be joined, the process proceeds to step 310.

Subsequent to steps 304, 310 and 312, it is checked whether there is no region to be processed (step 313). When the result at step 313 is YES, the process is terminated. Adversely when the result is NO, the counter i is incremented by 1 (step 314), and the process returns to step 301.

In the region joining process #1 described above, regions which are decided to be joined together are joined together in the X direction. Hereafter, a joined region by the region joining process #1 is denoted by BL3. It is noted that the region joining process #1 cannot join regions BL2 together in the Y direction. For example, characters 'i' and 'j' are still separated into parts even after the execution of the region joining process #1.

A region joining process #2 subsequent to the region joining process #1 enables regions BL3 to be joined together in the Y direction.

Figure 9:
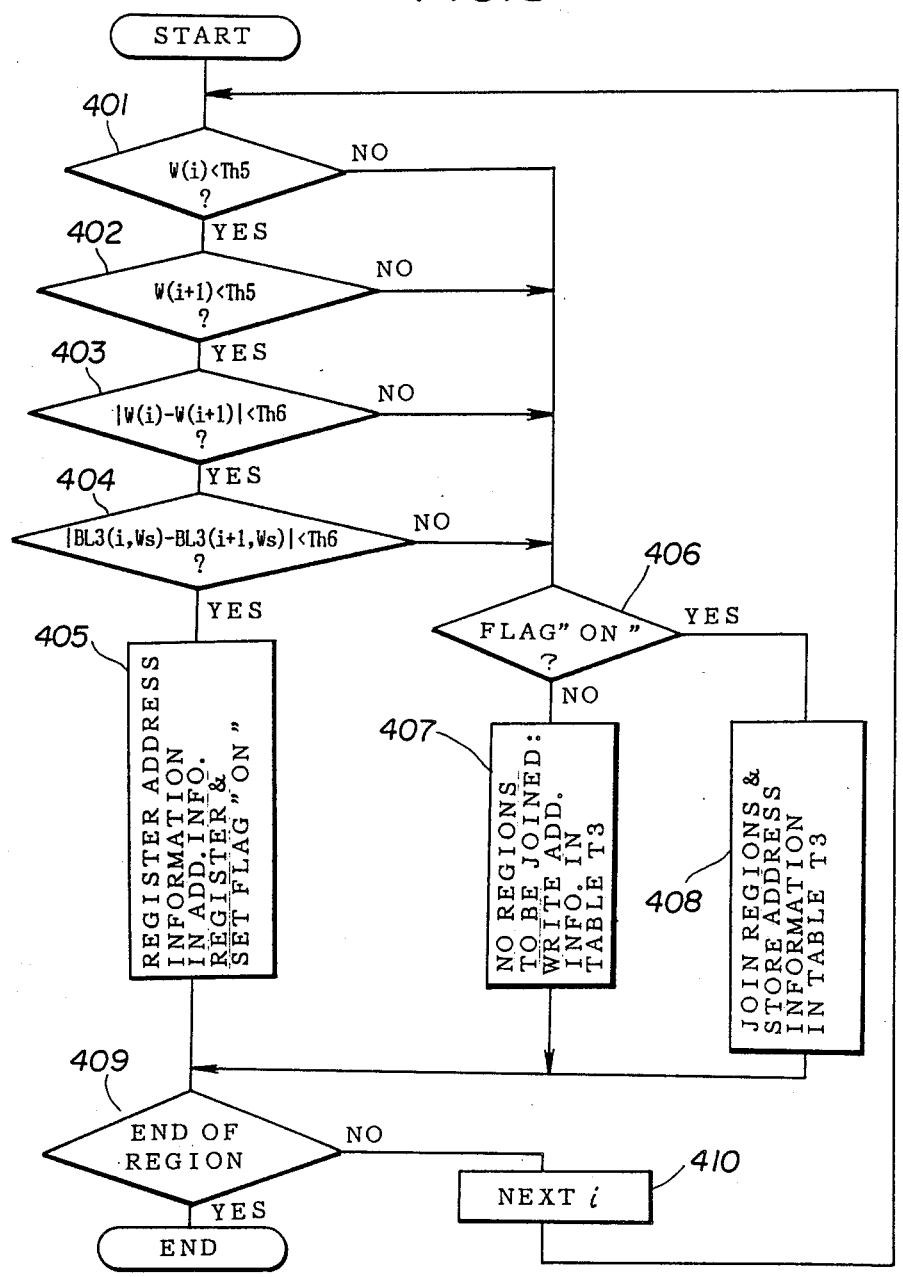
FIG. 9 is a flowchart of a second region joining process shown in FIG. 3.

A description is given of the region joining process #2 at step 106 shown in FIG. 3, by referring to FIG. 9 which shows a detailed flowchart of the step 106.

At step 401, the width W(i) to the region BL3(i) is compared with a predetermined threshold value $Th_5$. When the width W(i) is equal to or larger than the threshold value $Th_5$, the width W(i+1) of the region BL3(i+1) adjacent to the region BL3(i) included in the region BL1 is compared with the threshold value $Th_5$ (step 402). When the width W(i+1) is equal to or larger than a predetermined threshold value $Th_5$, an absolute value of a difference between the width W(i) and the width W(i+1) is compared with the threshold value $Th_6$ (step 403). When the absolute value of the difference is equal to or larger than the threshold value $Th_6$, an absolute value of a difference between the X address at the start point of the region BL3(i) and the X address at the start point of the region BL3(i+1), i.e., $|BL3(i, Ws) - BL3(i+1, Ws)|$ is compared with the threshold value $Th_6$ (step 404). When the the absolute value of the difference is equal to or larger than the threshold value $Th_6$, the process proceeds to step 405. It can be seen from the above description that the adjacent regions BL3(i) and BL3(i+1) are decided to be joined together when both the widths W(i) and W(i+1) are smaller than the threshold value $Th_5$, the absolute value of the difference in width between the adjacent regions is smaller than the threshold value $Th_6$, and the absolute value of the difference in the X address at the start point is smaller than the threshold value $Th_6$. Additionally, address information of the regions to be joined together is registered and simultaneously the joint flag is set. When one of the conditional expressions at steps 401 through 404 is not satisfied, the process proceeds to step 406.

At step 406, it is checked whether or not the joint flag FLAG has been set. If the result at step 406 is YES, which means that there is at least a region to be joined which is obtained by the previous process, the process proceeds to step 408. At step 408, an address of the joined region is calculated by using the registered address information obtained at step 405 and the address of the region BL3(i), and is then registered in the joint table T3 provided in the main memory 26. If the result at step 406 is NO, the process proceeds to step 407. In this case where there is no region to be joined, the address information of the region BL3(i) is stored in the joint table T2.

At step 409, it is checked whether all the regions BL3 have been processed or not. If the result is NO, the counter i is incremented by 1 at step 410, and the process returns to step 401, so that the next BL3 is processed.

In the region joining process #2, a region of the character string 'the', a region of the character string 'ABC' and regions of five remaining strings are finally extracted. That is, regions of characters or character strings belonging to one character line are extracted as one region. The extracted region may be subjected to the conventional projection manner, so that each character may be segmented for character recognition process per character. Hereafter a region obtained by joining regions BL3 together is represented by BL4.

Regions BL3 which should be joined together are mostly joined together when the region joining process #2. However there is a probability that regions to be joined still remain without being joined. For this reason, the region joining process #3 is executed at step 108 in the present embodiment. The region joining process #3 is carried out for each of the regions BL1. In operation the joint table T3 is referred to and a process for joining regions BL3 together in the X direction is performed. This process is the same as the region joining process #1.

Therefore, it becomes possible to extract regions of characters having similar sizes and character lines composed of characters having similar sizes from the document having characters of different sizes such as the document of FIGS. 1A and 1B. In other words, the regions can be extracted depending on the sizes of the characters on the document.

Figure 10A:
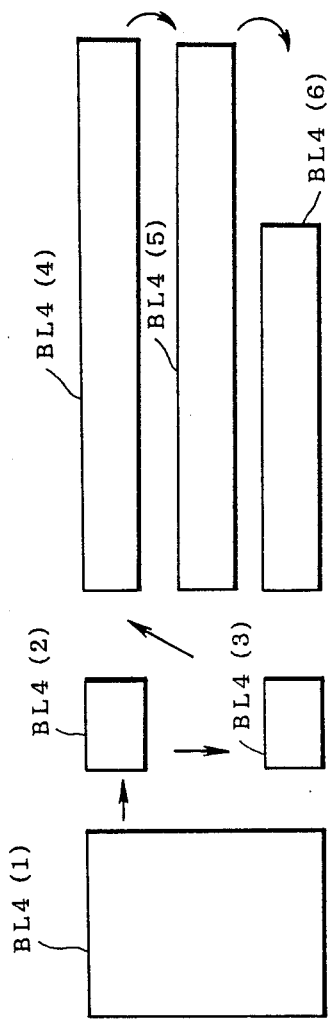
FIGS. 10A through 10C are views for explaining a region rearranging process in a second preferred embodiment of the present invention.
Figure 10C:
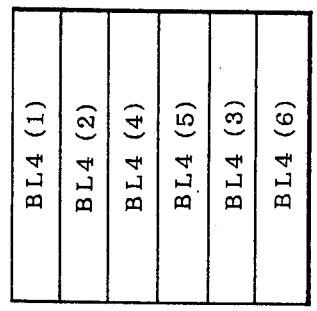
Figure 10B:
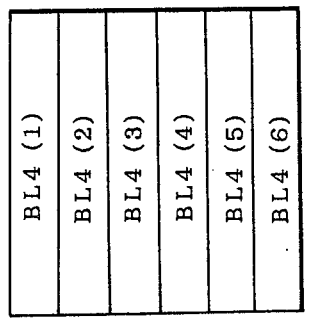

When the region extracting process described above is carried out for the document shown in FIG. 1B, regions BL4(1) through BL4(6) corresponding to the regions 11 through 16, respectively are obtained in this sequence as shown in FIG. 10A, and are stored in a region stored in the main memory 26 as shown in FIG. 10B. The region BL4(1) has a large character or symbol, the region BL4(2) is concerned with the address information, the region BL4(3) is concerned with the information of a telephone number, the regions BL4(4) BL4(5) are concerned with the address information, and the region BL4(6) is concerned with the information of the telephone number. According to the process of FIG. 3, the regions BL4(2) and BL4(4) in one character line are separately extracted. Similarly, the regions BL4(3) and BL4(6) in the same character line are also separately extracted. However, it is noted that the regions BL4(2) and BL4(4) belong to the same category of the address information, and the regions BL4(3) and BL4(6) belong to the same category of the telephone number information. Therefore, it is desirable to join the regions BL4(2) and BL4(4) together in order to carry out character recognition per character line in which the knowledge dictionary prepared for each of the categories is used. Likewise it is desirable to join the regions BL4(3) and BL4(6). That is, character lines belonging the same category are joined together so as to form one character line. The category of the joined character line can be presumed by obtaining information such as positions of regions to be joined so as to form the one character line region and the size of the characters contained therein. In this regard, it is desirable to interchange the regions BL4 with each other so as to form one character line region of a specific category in the main memory 26.

Figure 11:
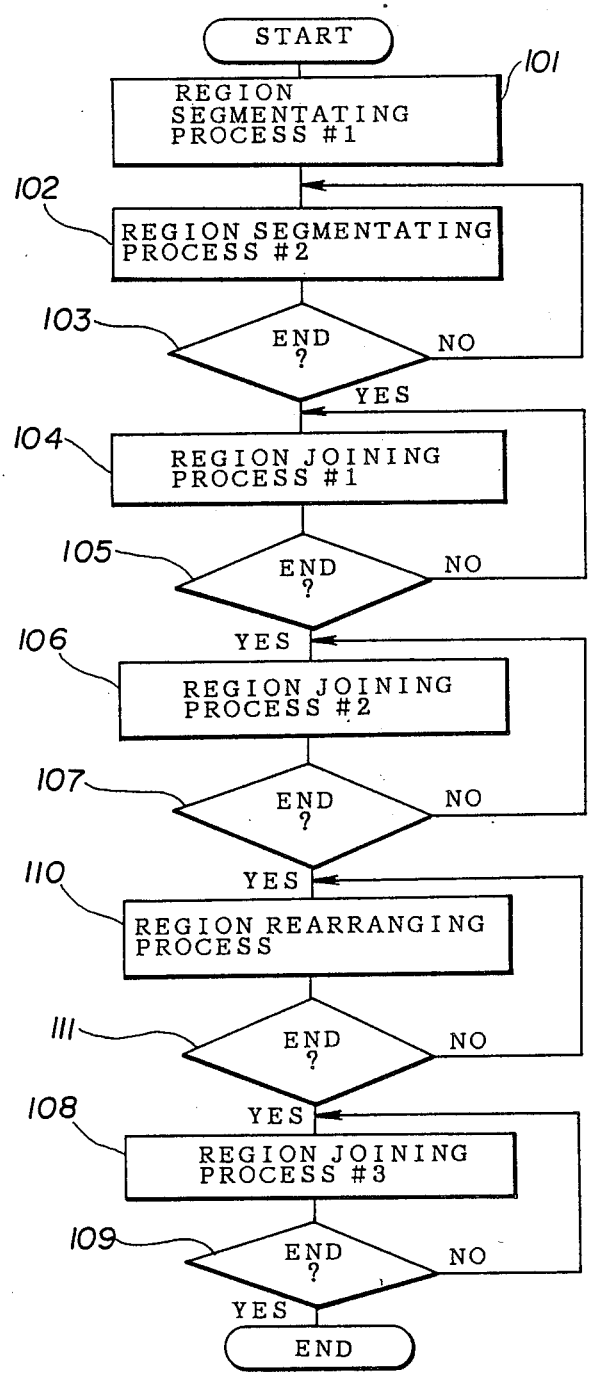
FIG. 11 is a flowchart of the second embodiment of the present invention.

FIG. 11 is a flowchart of another embodiment of the present invention including a process for rearranging regions BL4 by interchanging those regions with each other. In the embodiment of FIG. 11, a region rearranging process 110 and a subsequent discrimination step 111 are added to the flowchart of FIG. 3.

Figure 12:
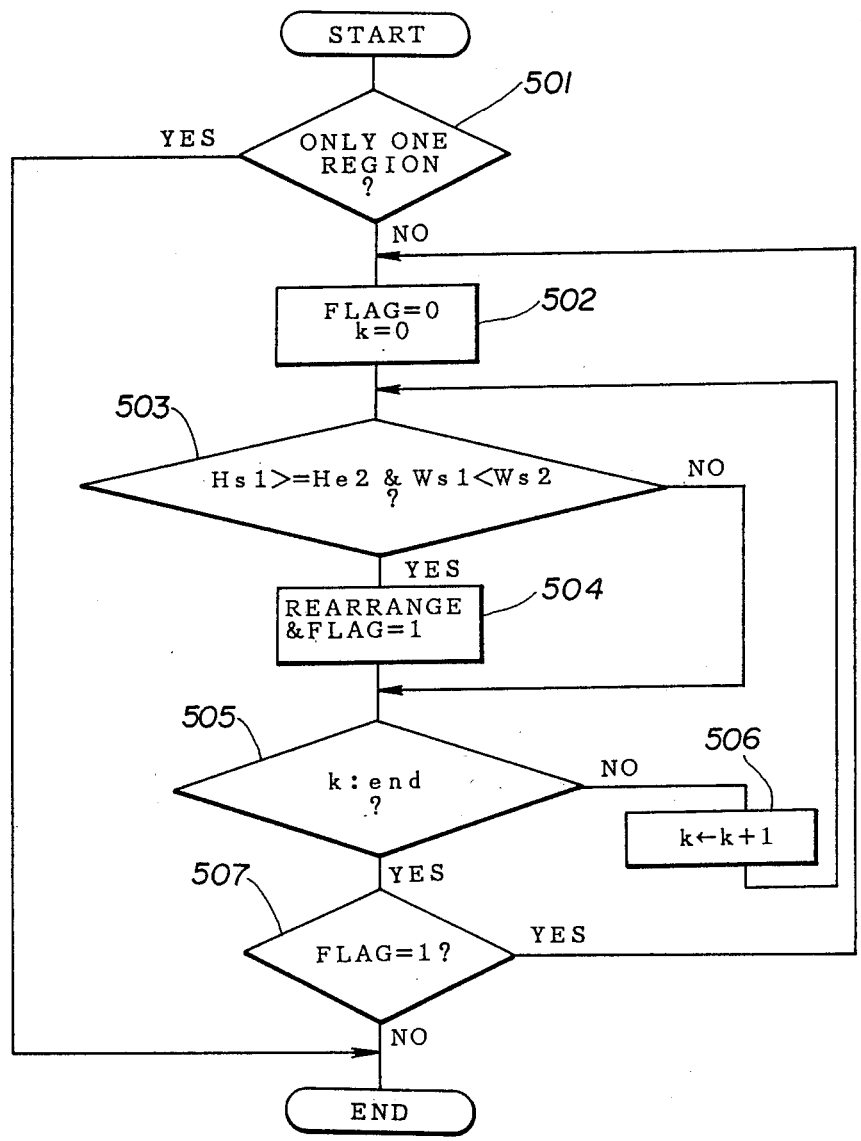
FIG. 12 is a flowchart of the region rearranging process shown in FIG. 11.

FIG. 12 shows a detailed flowchart of steps 110 and 111. Firstly, the number of regions BL4 in the region BL1 is detected (step 501). When only one region BL4 exists in the region BL1, the process ends. When the number of regions is equal to or more than 2, the flag FLAG is reset and the counter k is cleared (step 502). Then step 503 is performed.

It is now assumed that two regions BL4 to be compared for deciding whether or not they are to be joined together are indicated by R1 and R2, an Y address at the start point of the region R1 is indicated by $Hs_1$, a Y address at the end point of the region R2 is indicated by $He_2$, an X address at the start point of the region R1 is indicated by $Ws_1$, and an X address at the start point of the region R2 is indicated by $Ws_2$. At step 503, a comparison between $Hs_1$ and $He_2$ and a comparison between $Ws_1$ and $Ws_2$ are carried out. When $Hs_1 > He_2$ (which means that the uppermost end of the region R1 is not located at upper position with respect to the lowermost end of the region R2) and when $Ws_1 < Ws_2$ (which means that the left-hand side of the region R1 is positioned at the left-hand side of the left-hand side of the region R2), the regions R1 and R2 are interchanged with each other and the flag FLAG is set. Alternatively, the conditional expression at step 503 is not satisfied, the process proceeds directly to step 505.

At step 505, it is checked whether or not the value of the counter k has reached the number of the regions BL4 in the region BL1. When the result is negative, the process proceeds to step 506, at which the value of the counter k is incremented by 1. Alternatively when the result at step 505 is affirmative, the process proceeds to step 507, at which it is checked whether the flag FLAG has been set. When the result is affirmative, the process returns to the step 502. Adversely when the result is negative, the process ends.

The process of FIG. 12 is repeatedly carried out until all the regions BL4 have been processed. Then the region rearranging process is carried out for the regions BL4 in the next region BL1.

When the region rearranging process is carried out for the sequence of the regions BL4(1) to BL4(6) shown in FIG. 10B, the sequence of the arrangements of the regions as shown in FIG. 10C are obtained. Then, the region joining process #3 is carried out for the rearranged regions BL4. In this case it is checked whether or not regions BL4 should be joined together by referring to the relative positional relationship and the relative size. The two regions BL4(2) and BL4(4) are joined together to form one region, and two region BL4(3) and BL4(6) are joined together to form one region. As a result, two regions BL4(2) and BL4(4) concerning the address information are joined together to form one region concerning the address information, and the two regions BL4(3) and BL4(6) are joined together to form one region concerning the telephone number.

In this manner, it becomes possible to extract a joined region in which characters or character strings belonging to the same category in one character line are joined together. Therefore, it is possible not only to easily segment each character from the joined region by the conventional projection process but also to presume the category of the joined region by finding information of the location of the character line and the size of the characters included in the character line and to carry out the character recognition per character line in which the knowledge dictionary is used.

The present invention is not limited to the above embodiments, but various variations and modifications may be made without departing from the scope of the present invention. For example, the region joining process #2 may be carried out before the region joining process #1.

What is claimed is:

1. A character region extracting method for character recognition comprising the steps of;
    segmentating a first region (BL1) from a document image by extracting projection of the document image in a first direction parallel to a character string and detecting a range in which the projection is continuous in a second direction perpendicular to the first direction, the range defining the first region;
    segmentating a second region (sBL1) from the first region by extracting projection of the first region in the second direction and detecting a range in which the projection is continuous in the first direction, the range defining the second region; and
    segmentating a third region (BL2) from the second region by extracting projection of the second region in the first direction and detecting a range in which the projection is continuous in the second direction, the range defining the third region.

2. A character region extracting method as claimed in claim 1, further comprising the step of joining third regions in the first direction by comparing a relationship of a relative location between the third regions and a relationship of a relative size between the third regions, so that a fourth region (BL3) containing characters or a character string is extracted.

3. A character region extracting method as claimed in claim 2, further comprising the step of joining fourth regions in the second direction by comparing a relationship of a relative location between the fourth regions and a relationship of a relative size between the fourth regions, so that a fifth region (BL4) containing characters or a character string is extracted.

4. A region character extracting method as claimed in claim 3, further comprising the step of rearranging the fifth regions by comparing a relationship of a relative location between the fifth regions so that characters and character strings included in one character line are continuously arranged.

5. A character region extracting method as claimed in claim 4, further comprising the step of joining the rearranged fifth regions in the first direction by comparing a relationship of a relative location between the rearranged fifth regions and a relationship of a relative size between the rearranged fifth regions, so that a sixth region containing the characters or character strings in said one character line is extracted as one character region.

6. A character region extracting method as claimed in claim 5, wherein the fifth regions each related to the same category of information indicated by characters included in the fifth regions are joined together.

7. A character region extracting method as claimed in claim 1, wherein the projection extracted in each of the steps is represented by presence and non-presence of a black pixel in the document image in the first or second direction.

8. A character region extracting method as claimed in claim 1, wherein the projection extracted in each of the steps is represented by the number of black pixels in the first or second direction.

9. A character region extracting apparatus adapted to character recognition comprising;
    optical scanning means for extracting a document image in the form of an electric signal by optically scanning a document;
    an image memory for storing the document image extracted by the optical scanning means;
    projection extracting means for extracting projection of the document image in a first and second direction, the first direction corresponding to a scanning direction in the optical scanning means and the second direction being perpendicular to the first direction;
    a projection buffer for storing the projection in each of the first and second direction extracted by the projection extracting means;
    region segmentating means for segmentating a region by using the projection stored in the projection buffer, the region segmentating means further comprising a first means for segmentating a first region (BL1) from the document image by using the extracted projection of the document image in the first direction and detecting a range in which the projection is continuous in the second direction, said range defining the first region; a second means for segmentating a second region (sBL1) from the first region by using the extracted projection of the first region in the second direction and detecting a range in which the projection is continuous in the first direction, the range defining the second region; and a third means for segmentating a third region (BL2) from the second region by using the extracted projection of the second region in the first direction and detecting a range in which the projection is continuous in the second direction, the range defining the third region; and
    memory means for storing the extracted third region.

10. A character region extracting apparatus as claimed in claim 9, wherein the region segmentating means is implemented by a central processing unit.

11. A character region extracting apparatus as claimed in claim 10, wherein the region segmentating means further comprises a fifth means for joining fourth regions in the second direction by comparing a relationship of a relative location between the fourth regions and a relationship of a relative size between the fourth regions, so that a fifth region (BL4) containing characters or a character string is extracted.

12. A character region extracting apparatus as claimed in claim 11, wherein the region segmentating means further comprises means for rearranging the fifth regions by comparing a relationship of a relative location between the fifth regions so that characters and character strings included in one character line are continuously arranged.

13. A character region extracting apparatus as claimed in claim 12, wherein the region segmentating means further comprises for joining the rearranged fifth regions in the first direction by comparing a relationship of a relative location between the rearranged fifth regions and a relationship of a relative size between the rearranged fifth regions, so that a sixth region containing the characters or character strings in said one character line is extracted as one character region.

14. A character region extracting apparatus as claimed in claim 13, wherein the fifth regions each related to the same category of information indicated by characters included in the fifth regions are joined together.

15. A character region extracting apparatus as claimed in claim 9, wherein the region segmentating means further comprises a fourth means for joining third regions in the first direction by comparing a relationship of a relative location between the third regions and a relationship of a relative size between the third regions, so that a fourth region (BL3) containing characters or a character string is extracted.

16. A character region extracting apparatus as claimed in claim 9, wherein the projection extracted by the projection extracting means is represented by presence and non-presence of a black pixel in the document image in the first or second direction.

17. A character region extracting apparatus as claimed in claim 9, wherein the projection extracted by the projection extracting means is represented by the number of black pixels in the first or second direction.

* * * * *